(12) United States Patent
Koh

(10) Patent No.: US 9,673,427 B2
(45) Date of Patent: Jun. 6, 2017

(54) BATTERY PACK

(71) Applicant: Samsung SDI Co., Ltd., Yongin-si, Gyeonggi-do (KR)

(72) Inventor: Seok Koh, Yongin-si (KR)

(73) Assignee: Samsung SDI Co., Ld., Yongin-si (KR)

( * ) Notice: Subject to any disclaimer, the term of this patent is extended or adjusted under 35 U.S.C. 154(b) by 190 days.

(21) Appl. No.: 14/535,214

(22) Filed: Nov. 6, 2014

(65) Prior Publication Data

US 2015/0064507 A1   Mar. 5, 2015

Related U.S. Application Data

(63) Continuation of application No. 13/244,194, filed on Sep. 23, 2011, now Pat. No. 9,065,085.

(60) Provisional application No. 61/477,016, filed on Apr. 19, 2011.

(51) Int. Cl.
| | |
|---|---|
| *H01M 10/42* | (2006.01) |
| *H01M 2/20* | (2006.01) |
| *H01M 2/02* | (2006.01) |
| *H01M 2/10* | (2006.01) |
| *H01M 2/34* | (2006.01) |

(52) U.S. Cl.
CPC ....... *H01M 2/0212* (2013.01); *H01M 2/1061* (2013.01); *H01M 2/204* (2013.01); *H01M 2/34* (2013.01); *H01M 2/348* (2013.01); *H01M 10/425* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2005/0271934 A1* | 12/2005 | Kiger | H01M 2/105 429/159 |
| 2006/0105237 A1 | 5/2006 | Oh | |
| 2007/0222417 A1 | 9/2007 | Kim et al. | |
| 2008/0008910 A1* | 1/2008 | Koh | H01M 10/42 429/7 |

(Continued)

FOREIGN PATENT DOCUMENTS

| | | |
|---|---|---|
| CN | 1523688 A | 8/2004 |
| CN | 1753237 A | 3/2006 |
| CN | 101119035 A | 2/2008 |

(Continued)

OTHER PUBLICATIONS

Office Action issued Nov. 11, 2014 in European Patent Application No. 12150338.7.

(Continued)

*Primary Examiner* — Patrick Ryan
*Assistant Examiner* — Christopher Domone
(74) *Attorney, Agent, or Firm* — Knobbe Martens Olson & Bear LLP

(57) ABSTRACT

An embodiment of the present invention provides a battery pack comprising a plurality of battery cells; a protective circuit module coupled to at least two battery cells; and a case accommodating the battery cells and the protective circuit module, wherein the two battery cells are disposed on a surface of the case, and the protective circuit module is disposed between the two battery cells on the surface of the case.

17 Claims, 12 Drawing Sheets

(56) References Cited

U.S. PATENT DOCUMENTS

2009/0072785 A1* 3/2009 Moon .................. H01M 2/105
                                                     320/112
2010/0159313 A1  6/2010 Byun et al.

FOREIGN PATENT DOCUMENTS

CN    101764247 A    6/2010
EP      1271672 A1   1/2003

OTHER PUBLICATIONS

Office Action issued on Dec. 9, 2015 for Chinese Patent Application No. 201210021182.1.

* cited by examiner

BATTERY PACK

RELATED APPLICATIONS

This application claims priority to and the benefit of U.S. application Ser. No. 13/244,194, filed on Sep. 23, 2011, which claims benefit to U.S. Provisional Application No. 61/477,016, filed on Apr. 19, 2011, the entire content of which are incorporated herein by reference.

BACKGROUND

Field

Embodiments relate to a battery pack.

Description of the Related Technology

In general, electronic devices, such as laptop PCs, mini notebooks, netbooks, mobile computers, ultra mobile personal computers (UMPC), and portable multimedia players (PMP), use as a portable power source battery packs in which a plurality of battery cells are connected in series and/or in parallel. Such a battery pack typically includes a protective circuit module ("PCM") for protecting battery cells from overcharge, overdischarge, or overcurrent, and the battery cells and the PCM are typically housed in a case.

SUMMARY

A battery pack according to an embodiment of the present invention includes: a plurality of battery cells; a protective circuit module coupled to at least two battery cells; and a case accommodating the battery cells and the protective circuit module, wherein the two battery cells are disposed on a surface of the case, and the protective circuit module is disposed between the two battery cells on the surface of the case.

According to an aspect, at least one battery cell comprises a first electrode plate having a first polarity and a second electrode plate having a second polarity opposite the first polarity, the first electrode plate is connected to a first cell tab and the second electrode plate is connected to a second cell tab. The protective circuit module may comprise a circuit board, and the circuit board may comprise a first conductive pad, a second conductive pad separated from the first conductive pad, and a through hole under the first conductive pad.

According to an aspect, the first cell tab of the battery cell extends from the battery cell to couple to the first conductive pad.

According to an aspect, the first conductive pad comprises a first portion disposed over the through hole in the circuit board, a second portion bent upward from the first portion, and a third portion bent from the second portion such that the third portion is substantially parallel to the first portion, wherein the first cell tab is positioned between the first and third portions and adhered to the first and third portions.

According to an aspect, the first conductive pad and the first cell tab comprise different materials. The first conductive pad may comprise nickel, a nickel alloy, copper or a copper alloy, and the first cell tab may comprise aluminum or an aluminum alloy.

According to an aspect, the second cell tab of the battery cell extends from the battery cell and is bent a plurality of times, and the second cell tab is coupled to a positive temperature coefficient assembly.

According to an aspect, the positive temperature coefficient assembly comprises a lead plate coupled to the second conductive pad, and the lead plate extends in a direction parallel to the first cell tab.

According to an aspect, the second conductive pad and the lead plate comprise the same materials. The second conductive pad and the lead plate may comprise nickel, nickel alloy, copper, or copper alloy.

According to an aspect, the case comprises a resin frame covering side surfaces of the battery cells and of the protective circuit module, and labels covering upper and lower surfaces of the battery cells and of the protective circuit module. The resin frame may surround the battery cells and the protective circuit module and comprise a pair of sidewall areas for accommodating the protective circuit module. The resin frame may comprise a height and the pair of sidewall areas comprises a height that is less than the height of the resin frame. The resin frame may further comprise a terminal receiving portion extending from the resin frame for accommodating a terminal extending from the circuit board. The resin frame may comprise a through hole under the first conductive pad and under the through hole in the circuit board.

According to an aspect, a pouch accommodates a battery cell, wherein the pouch comprises a metal layer, a first insulating layer disposed at one side of the metal layer, and a second insulating layer disposed at another side of the metal layer, and wherein the metal layer and the first and second insulating layers are folded at one end portion adjacent to the resin frame, wherein the end portion is encompassed by the resin frame.

BRIEF DESCRIPTION OF THE DRAWINGS

FIG. 2b is a partial magnifying view illustrating 2b of FIG. 2a.

FIG. 3c is a cross sectional view taken along line 3c-3c of FIG. 3a.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
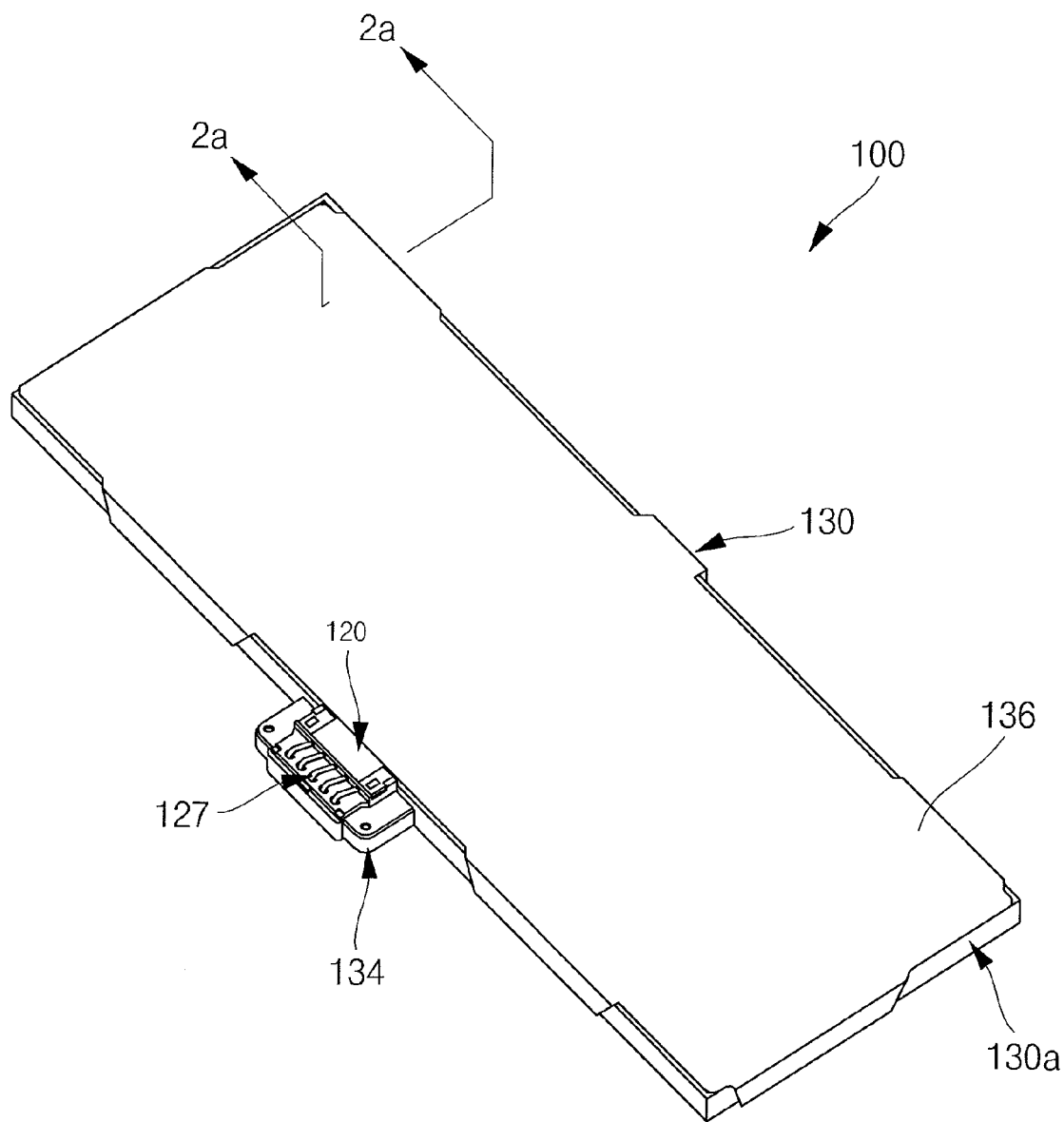
FIG. 1a is a perspective view illustrating a battery pack according to an embodiment of the present invention.
Figure 1B:
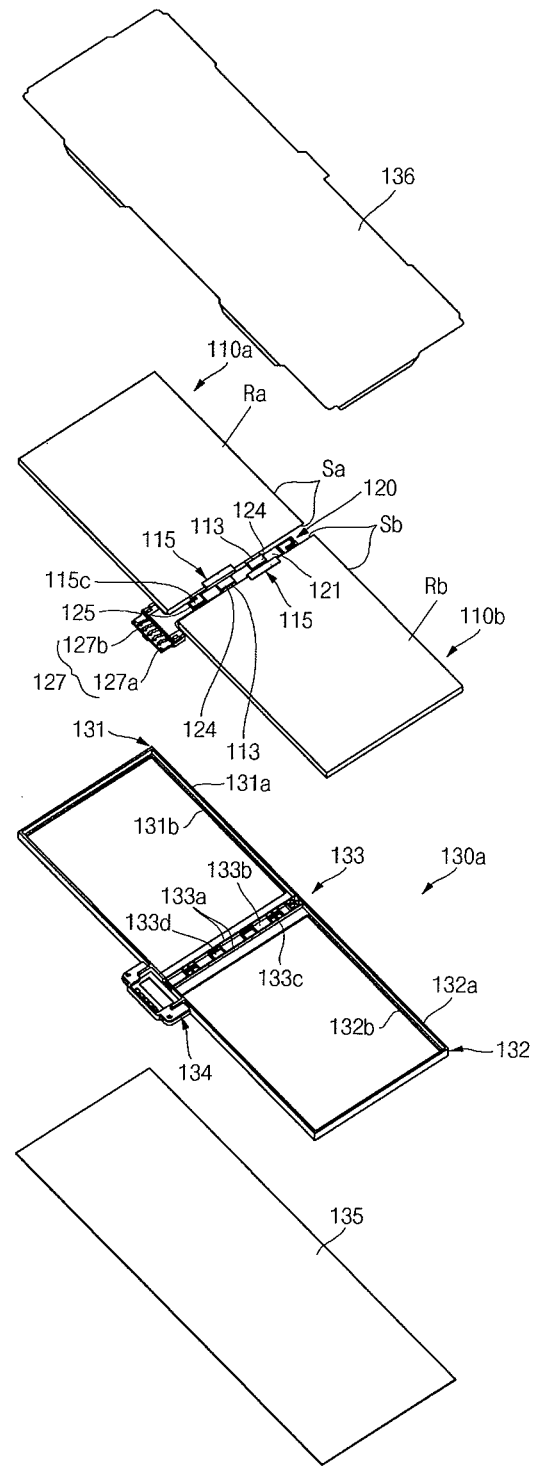
FIG. 1b is an exploded perspective view of the battery pack.

FIG. 1a is a perspective view illustrating a battery pack according to an embodiment of the present invention, and FIG. 1b is an exploded perspective view of the battery pack Referring to FIGS. 1a and 1b, a battery pack 100 according to an embodiment of the present invention includes a first battery cell 110a and a second battery cell 110b disposed oppositely on the same surface, a PCM 120 disposed on the same surface between the first battery cell 110a and the second battery cell 110b, and a case 130 configured to receive the first battery cell 110a, the second battery cell 110b, and the PCM 120.

Although two battery cells are connected to the PCM in the drawings, embodiments of the present invention is not limited thereto. In other words, at least two battery cells may be electrically connected to the PCM.

The first and second battery cells 110a and 110b are disposed oppositely to each other, and electrically connected to the PCM 120. Here, the first and second battery cells 110a and 110b may be pouch types. However, embodiments of the present invention are not limited thereto. In other words, the battery cells may be polygonal, prismatic or cylindrical types.

The first and second battery cells 110a and 110b may include an electrode assembly, a pouch, a first cell tab 113, a second cell tab, and a PTC assembly 115.

In addition, the first and second battery cells 110a and 110b may include a pair of long-side areas Ra and Rb disposed oppositely to each other, and four short-side areas Sa and four short-side areas Sb disposed along edges of the long-side areas Ra and Rb, respectively. Here, the long-side areas Ra and Rb are relatively bigger than the short-side areas Sa and Sb, and the short-side areas Sa and Sb are relatively smaller than the long-side areas Ra and Rb.

The PCM 120 may be defined as being disposed between the short-side areas Sa of the first battery cell 110a and the short-side areas Sb of the second battery cell 110b. Here, one of the short-side areas Sa of the first battery cell 110a and one of the short-side areas Sb of the second battery cell 110b are disposed oppositely to each other, and the long-side area Ra of the first battery cell 110a and the long-side area Rb of the second battery cell 110b are not disposed oppositely to each other.

Structures of the first and second battery cells 110a and 110b are described in detail hereinafter.

The PCM 120 may be disposed in a space between the first and second battery cells 110a and 110b. Of course, the PCM 120 may be electrically connected to the first and second battery cells 110a and 110b as described above. The PCM 120 may include a circuit board 121 including a plurality of wire patterns and a plurality of through holes, a plurality of first conductive pads 124, a plurality of second conductive pads 125, a plurality of protection devices, and a terminal assembly 127.

Here, the terminal assembly 127 may be electrically connected to an end portion of the circuit board 121, and protrudes at a predetermined length toward outside areas of the first and second battery cells 110a and 110b. Further, the terminal assembly 127 may include a resin molding portion 127a mechanically coupled with the circuit board 121, and a terminal 127b electrically connected to the circuit board 121. In addition, the end portion of the circuit board 121 may have an extended width so that the terminal assembly 127 can be coupled with the end portion of the circuit board 121 in a stable manner. Here, the end portion of the circuit board 121 means the area protruding from the first and second battery cells 110a and 110b.

The case 130 may be configured to receive the first battery cell 110a, the second battery cell 110b, and the PCM 120, and protect the first battery cell 110a, the second battery cell 110b, and the PCM 120 from external environments. Specifically, the case 130 may include a resin frame 130a, a first label 135, and a second label 136.

More specifically, the resin frame 130a may include a first frame 131 configured to receive the first battery cell 110a, a second frame 132 configured to receive the second battery cell 110b, and a third frame 133 configured to receive the PCM 120.

Here, the first and second frames 131 and 132 may have quadrilateral shapes, and the third frame 133 may be disposed between the first and second frames 131 and 132.

The first frame 131 may include four sidewall areas 131a coming into contact with the four short-side areas Sa of the first battery cell 110a, and four bottom areas 131b coming into contact with edges of the long-side area (lower surface) of the first battery cell 110a. Here, width of the bottom area 131b is almost the same as height of the sidewall area 131a. Further, the second frame 132 includes four sidewall areas 132a coming into contact with the four short-side areas Sb of the second battery cell 110b, and four bottom areas 132b coming into contact with edges of the long-side area (lower surface) of the second battery cell 110b. Likewise, width of the bottom area 132b is almost the same as height of the sidewall area 132a.

In this manner, the four short-side areas Sa of the first battery cell 110a can be protected by the four sidewall areas 131a of the first frame 131, and the four short-side areas Sb of the second battery cell 110b can be protected by the four sidewall areas 132a of the second frame 132. In addition, when the first and second battery cells 110a and 110b are received by the first and second frames 131 and 132, the long-side areas Ra and Rb of the first and second battery cells 110a and 110b, i.e., the relatively bigger upper and lower surfaces of the first and second battery cells 110a and 110b, can be exposed to upper and lower sides through the first and second frames 131 and 132, respectively.

The third frame 133 may include a pair of sidewall areas 133a coming into contact with both side surfaces of the PCM 120 disposed oppositely to each other, a bottom area 133b disposed at a lower side of the PCM 120, and a plurality of supporting members 133c extending upward from the bottom area 133b to support the PCM from the lower side. The pair of sidewall areas may have a height that is less than the height of the third frame 133. Further, the bottom area 133b of the third frame 133 may include through holes 133d in a location corresponding to the first conductive pads 124 so that the first cell tabs 113 of the first and second battery cells 110a and 110b can be welded easily to the first conductive pads 124 disposed at the PCM 120. For example, a welding rod may be moved easily to the first conductive pad 124 through the through hole 133d. Here, one of the sidewall areas 133a disposed at the third frame 133 overlaps with one of the sidewall areas 131a of the first frame 131, and the other of the sidewall areas 133a disposed at the third frame 133 overlaps with one of the sidewall areas 132a of the second frame 132.

Meanwhile, a terminal receiving portion 134 extending laterally from the third frame 133 to receive the terminal assembly may be disposed at a side of the third frame 133. In other words, the terminal receiving portion 134 can protrude and extend from the first, second, and third frames 131, 132, and 133 at a predetermined length. In the present embodiment, the terminal receiving portion 134 constitutes the same surface with the first, second, and third frames 131, 132, and 133.

As described above, the case 130 may further include the first adhesive label 135, and the second adhesive label 136. The first label 135 may be attached to lower sides of the first, second, and third frames 131, 132, and 133, and, at the same time, to the long-side areas (lower surfaces) of the first and second battery cells 110a and 110b. Therefore, the long-side areas (lower surfaces) of the first and second battery cells 110a and 110b can be protected by the first label 135. Also, the second label 136 may be attached to upper sides of the first, second, and third frames 131, 132, and 133, and, at the same time, to the long-side areas (upper surfaces) of the first and second battery cells 110a and 110b, and the PCM 120. Therefore, the long-side areas (upper surfaces) of the first and second battery cells 110a and 110b and an upper portion of the PCM 120 can be protected by the first label 135.

In addition, although not illustrated in the drawings, insulating paper configured to block penetration of a foreign substance may be disposed between the PCM 120 and the second label 136. Further, a protective sheet configured to block penetration of a foreign substance or a reinforcing member configured to increase strength may be disposed between the first and second battery cells 110a and 110b and the first label 135, or between the both first and second battery cells 110a and 110b and the second label 136.

Figure 2A:
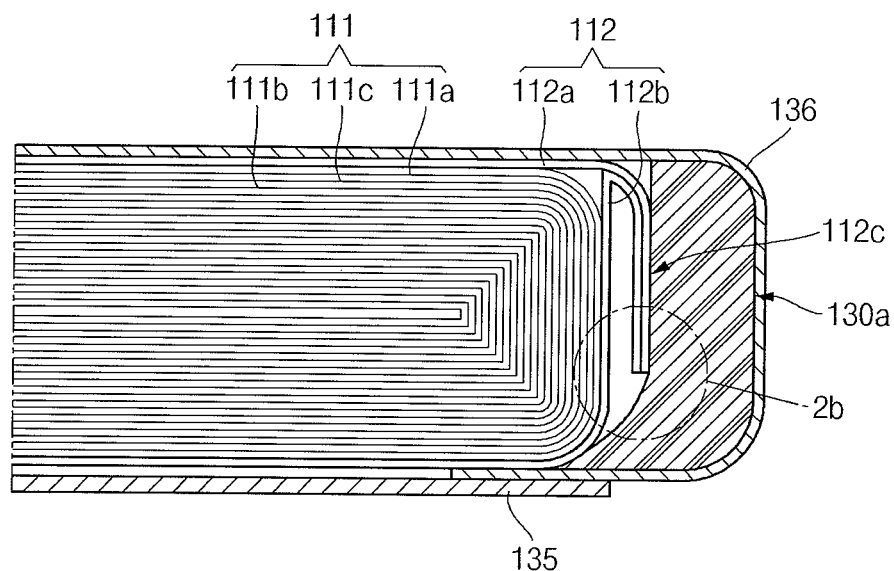
FIG. 2a is a cross sectional view taken along line 2a-2a of FIG. 1.
Figure 2B:
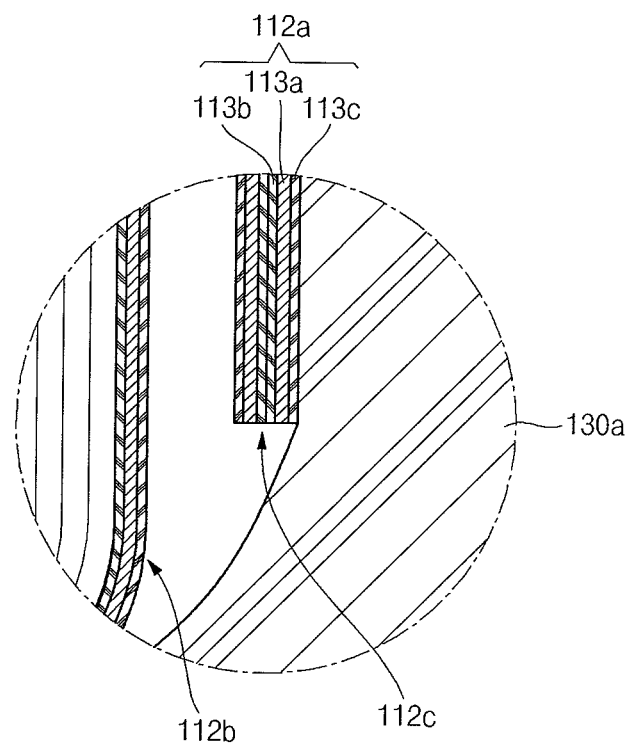

FIG. 2a is a cross sectional view taken along line 2a-2a of FIG. 1, and FIG. 2b is a partial magnifying view illustrating 2b of FIG. 2a.

Referring to FIG. 2a, the first battery cell 110a may include the electrode assembly 111, which includes a first electrode plate 111a, a second electrode plate 111b, and a separator 111c disposed between the first electrode plate 111a and the second electrode plate 111b, and the pouch 112 configured to cover the electrode assembly 111. Here, although the electrode assembly 111 is illustrated as a roll type, the electrode assembly 111 may be a stack type. Also, the first electrode plate 111a may have a positive polarity, and the second electrode plate 111b may have a negative polarity, or vice versa. In addition, the pouch 112 may include a first pouch 112a and a second pouch 112b, and entirely cover the electrode assembly 111. In the present embodiment, electrolyte is contained in the pouch 112.

A folded portion 112c formed by the first pouch 112a and the second pouch 112b being melted or glued to each other may be disposed at both sides of the electrode assembly 111. The folded portion 112c may be maintained in a state in which the folded portion 112c is folded from upward to downward. In other words, an end portion of the folded portion 112c looks downward.

Referring to FIG. 2b, for example, the first pouch 112a may include a metal layer 113a disposed at a center, a first insulating layer 113b disposed at one side of the metal layer 113a, and a second insulating layer 113c disposed at the other side of the metal layer 113a. The second pouch 112b may have the same layered structure as the first pouch 112a described above. The folded portion 112c is an area where the first insulating layers 113b of the first and second pouches 112 are glued or melted to each other and then folded downward, and each of the metal layers 113a may be exposed to an outer side through the first and second insulating layers 113b and 113c. However, as described above, the end portion of the folded portion 112c may be separated completely from external environments by the resin frame 130a since the end portion of the folded portion 112c looks downward. Therefore, the metal layer 113a of the folded portion 112c is not exposed to the outer side both during and after a process of assembling the battery pack 100, and an unwanted short circuit between the metal layer 113a of the folded portion 112c and an external device can be prevented. Further, processes of attaching additional protection tape for covering the end portion of the folded portion 112c may be omitted, since the end portion of the folded portion 112c is separated completely from external environments by the resin frame 130a.

Figure 3A:
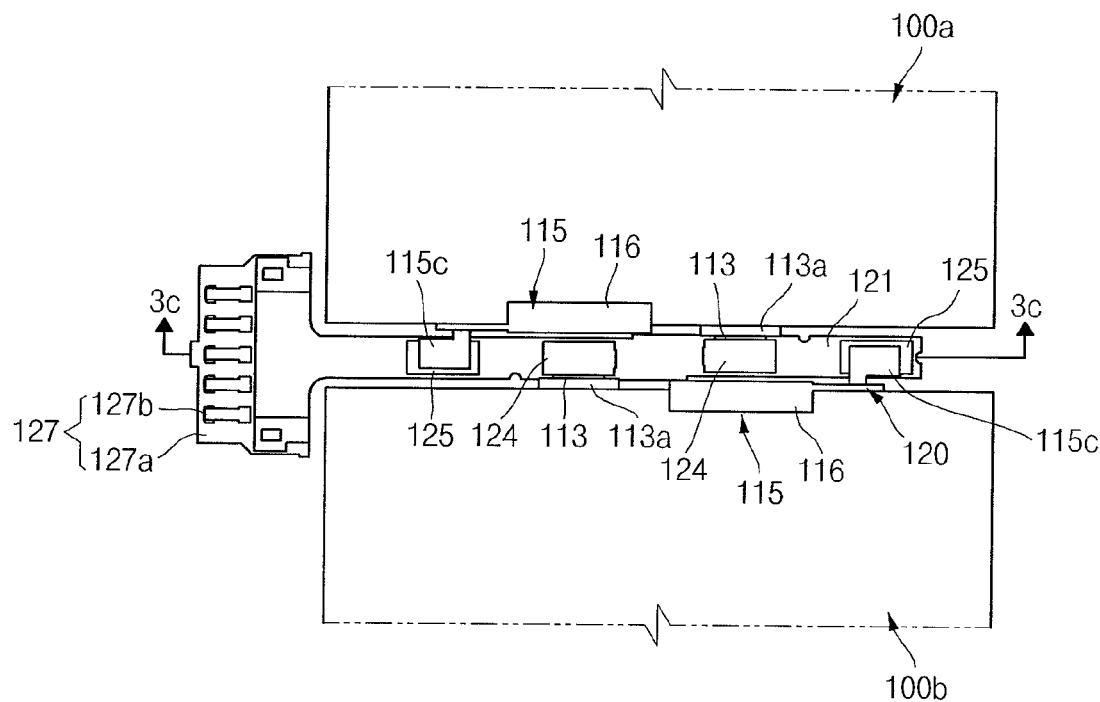
FIGS. 3a and 3b are a plan view and a bottom view illustrating connection between a battery cell and a PCM of the battery pack according to an embodiment of the present invention, respectively.
Figure 3B:
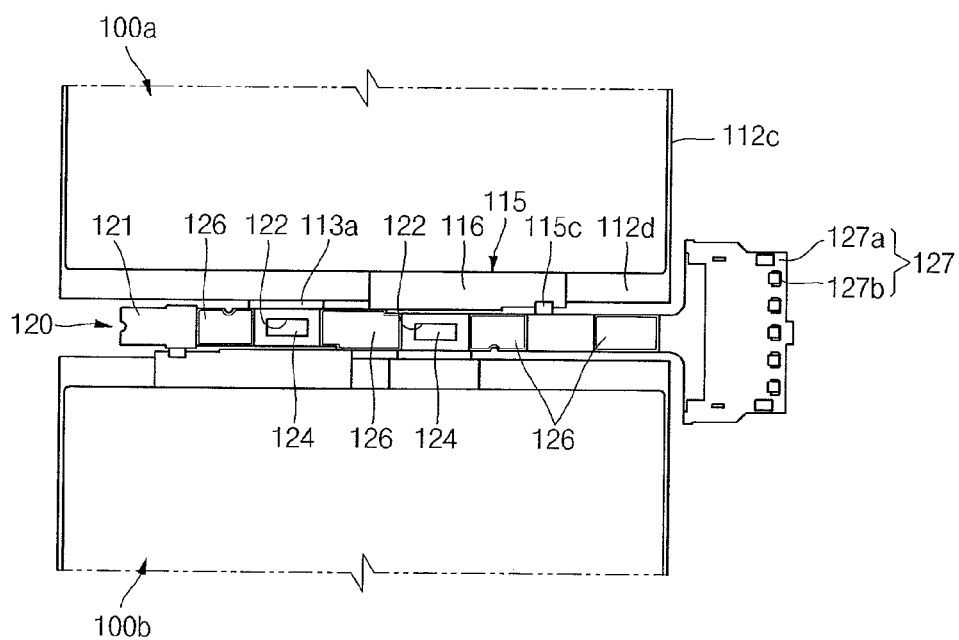
Figure 3C:
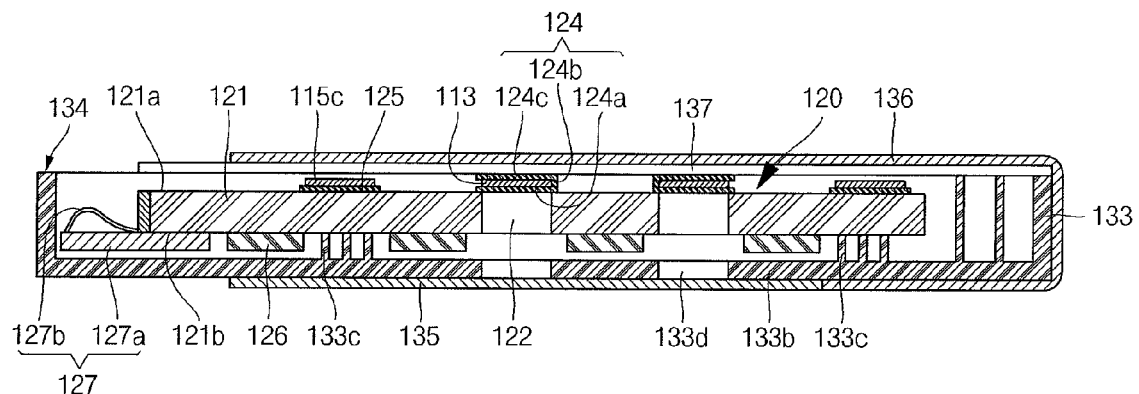

FIGS. 3a and 3b are a plan view and a bottom view illustrating connection between a battery cell and a PCM of the battery pack according to an embodiment of the present invention, respectively, and FIG. 3c is a cross sectional view taken along line 3c-3c of FIG. 3a. Here, the third frame 133, the terminal receiving portion 134, and first label 135, and the third label 136 are also illustrated in FIG. 3c.

Referring to FIGS. 3a to 3c, the PCM 120 may include the circuit board 121 having a rough rectangular shape and including the plurality of wire patterns (not illustrated) and through holes 122, a plurality of first conductive pads 124 connected to the wire patterns of the circuit board 121 to block the through holes 122, a plurality of second conductive pads 125 separated from the first conductive pads 124 and connected to other wire patterns, and a plurality of protection devices 126 connected to yet other wire patterns.

In addition, the PCM 120 may include the terminal assembly 127 electrically connected to the end portion of the circuit board 121, and the terminal assembly 127 may include the resin molding portion 127a and the plurality of terminals 127b. Of course, the plurality of terminals 127b are also electrically connected to the yet other wire patterns disposed at the circuit board 121. Here, the terminal assembly 127 is mechanically and electrically connected to an external device so that the first and second battery cells 110a and 110b are charged or discharged.

The circuit board 121 may include a roughly flat first surface 121a, and a roughly flat second surface 121b opposite to the first surface 121a, and the wire patterns are disposed on each of the first and second surfaces 121a and 121b. In addition, the through holes 122 may be formed through the first and second surfaces 121a and 121b of the circuit board 121. The first conductive pads 124 may be electrically connected to the wire patterns disposed on the first surface 121a of the circuit board 121, and block the through holes 122. The first conductive pads 124 may be disposed at the wire patterns on the first surface 121a of the circuit board 121, and can include first areas 124a configured to block the through holes 122, second areas 124b bent upward from the first areas 124a, and third areas 124c bent roughly in parallel with the first areas 124a from the second areas 124b. In other words, the first area 124a and the third area 124c can be separated from each other. Also, in actuality, the first cell tab 113 may be inserted and then welded between the first area 124a and the third area 124c of the first conductive pad 124. For example, the first conductive pad 124 may be formed of nickel or nickel alloy, and the first cell tab 113 may be formed of aluminum or aluminum alloy. However, embodiments of the present invention are not limited thereto. What is important is that the first conductive pad 124 and the first cell tab 113 may be formed of different materials.

Further, the second conductive pad 125 is also electrically connected to the other wire patterns disposed on the first surface 121a of the circuit board 121, and separated from the first conductive pad 124. Here, the second conductive pad 125 may have a rough flat panel shape. Also, a second lead plate 115c may be mounted onto and welded to the second conductive pad 125. For example, the second conductive pad 125 may be formed of nickel, nickel alloy, copper, or copper alloy, and the second lead plate 115c may be formed of nickel, nickel alloy, copper, or cooper alloy. However, embodiments of the present invention are not limited thereto. What is important is that the second conductive pad 125 and the second lead plate 115c are formed of the same material.

In addition, the protection devices 126 are electrically connected to the yet other wire patterns disposed on the second surface 121b of the circuit board 121. The protection devices 126 can prevent the first and second battery cells 110a and 110b from overcharge, overdischarge, or overcurrent, and protect the first and second battery cells 110a and 110b.

As described above, the protection device 126 can be received in the third frame 133 since the protection device 126 is disposed on the second surface 121b of the circuit board 121. Therefore, the entire first surface 121a of the circuit board 121 can have no protruding structure. In other words, the first surface 121a of the circuit board 121 can have a roughly flat surface. Therefore, thickness of the first and second battery cells 110a and 110b and the PCM 120 can be reduced, and thickness of the battery pack can be reduced.

In addition, the third frame 133 includes the through hole 133d formed correspondingly to the first conductive pad 124 and the through hole 122. Therefore, a welding rod may be moved easily to a lower surface of the first conductive pad 124 when welding is carried out after the first cell tab 113 is inserted into the first conductive pad 124.

Meanwhile, the first and second battery cells 110a and 110b have the same form, shape, structure, and structure of electrical connection to the PCM 120. Therefore, the structure of the first battery cell 110a and the structure of electrical connection of the first battery cell 110a to the PCM 120 are mainly described herein.

The first battery cell 110a may include the first cell tab 113 and the second cell tab (not illustrated), and the first cell tab 113 and the second cell tab are electrically connected to the first electrode plate 111a and the second electrode plate 111b disposed in the pouch 112, respectively. Further, the first cell tab 113 and the second cell tab may extend and protrude to an outer side through the flat portions 112d of the pouch 112, respectively. Here, the flat portion 112d may be a part where the first and second pouches 112a and 112b are glued or melted to each other, and can extend flatways at a predetermined length without being folded. In actuality, the flat portion 112d may be disposed between the folded portions 112c opposite to each other. Further, in actuality, the flat portions 112d of the first and second battery cells 110a and 110b may be disposed oppositely to each other.

Further, the first cell tab 113 may be linked to the first conductive pad 124 disposed at the circuit board 121, and the second cell tab is connected to the PTC assembly. As described hereinafter, the PTC assembly 115 may include a first lead plate connected to the second cell tab, a PTC device connected to the first lead plate, and the second lead plate

115c. Here, resistance of the PTC device can increase when the temperature of the first battery cell 110a increases. Also, one end portion of the second lead plate 115c may be connected to the PTC device, and the other end portion of the second lead plate 115c may be connected to the second conductive pad 125 disposed at the circuit board 121. In addition, the PTC assembly 115 may be covered by protection tape 116 so that the PTC assembly 115 can be protected from external environments.

In addition, the second lead plate 115c of the PTC assembly 115 may be connected to the second conductive pad 125 disposed at the circuit board 121.

In the abovementioned manner, embodiments of the present invention provide a thin battery pack including the first battery cell 110a, the second battery cell 110b, and the PCM 120 disposed on the same surface. Further, according to an embodiment of the battery pack of the present invention, an area occupied by the PCM 120 can be minimized and efficiency of spatial utilization can increase.

A letter 137 illustrated in FIG. 3c and not described is insulating paper configured to cover the PCM 120.

Figure 4:
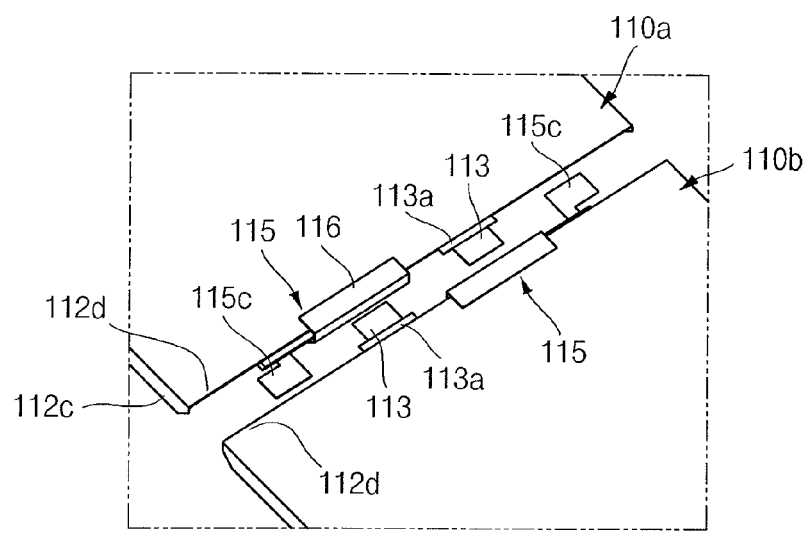
FIG. 4 is a perspective view illustrating a state in which a battery cell of a battery pack according to an embodiment of the present invention is arranged.

FIG. 4 is a perspective view illustrating a state in which a battery cell of a battery pack according to an embodiment of the present invention is arranged.

Referring to FIG. 4, the first battery cell 110a and the second battery cell 110b may be disposed oppositely to each other. In other words, the flat portions 112d of the first and the second battery cells 110a and 110b are disposed oppositely to each other. Also, the first cell tab 113 of the second battery cell 110b may be disposed between the first cell tab 113 and the second lead plate 115c of the first battery cell 110a. Also, the first cell tab 113 of the first battery cell 110a may be disposed between the first cell tab 113 and the second lead plate 115c of the second battery cell 110b.

In the abovementioned manner, the first cell tab 113 and the second lead plate 115c disposed at the first and second battery cells 110a and 110b as input and output units may be electrically connected to the PCM 120 with ease, causing no mutual interference.

Figure 5A:
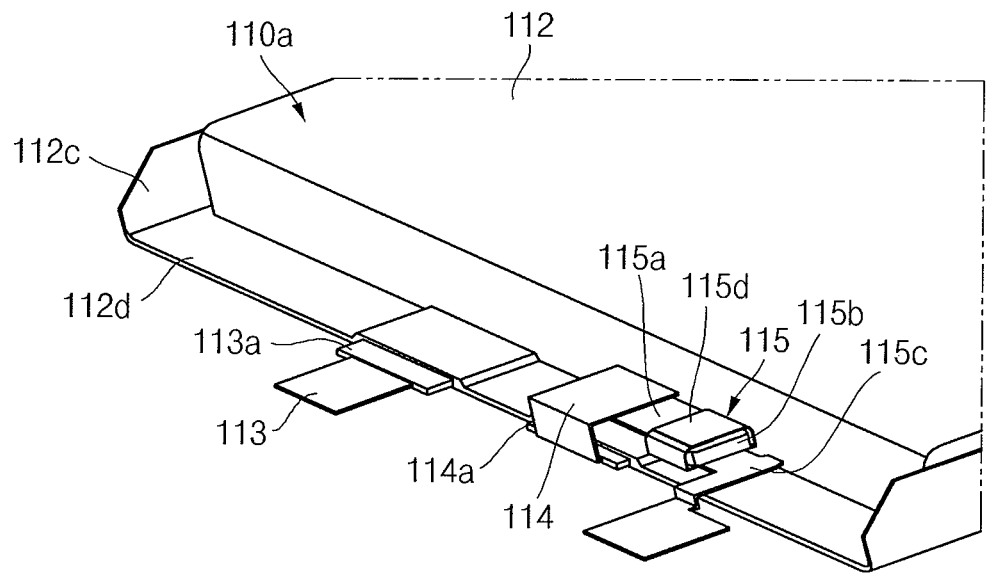
FIG. 5a is a perspective view illustrating a PTC assembly of the battery pack and a surrounding structure of the PTC assembly in a state when protection tape is not applied.
Figure 5B:
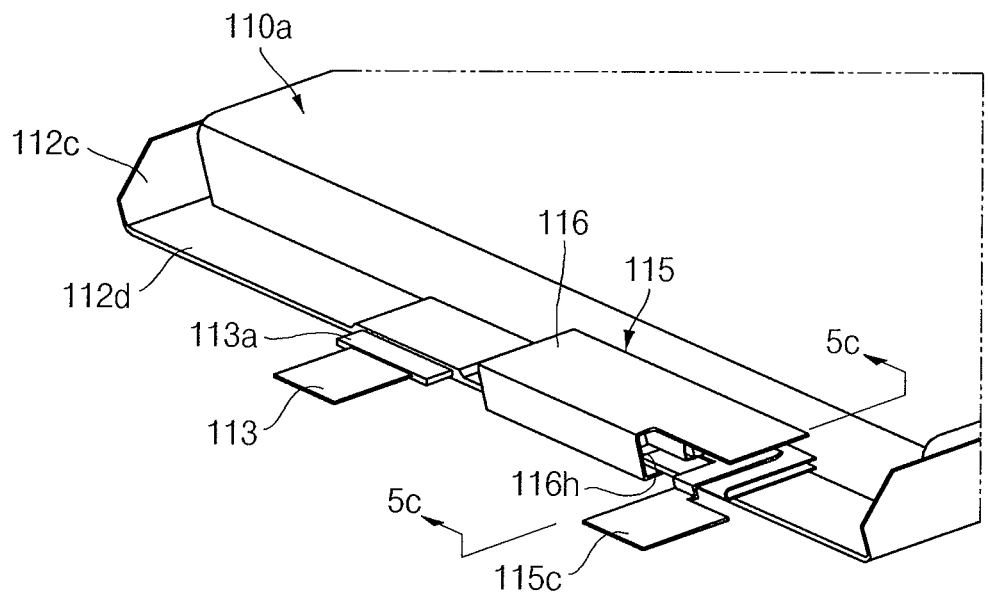
FIG. 5b is a perspective view illustrating the PTC assembly and the surrounding structure in a state when protection tape is applied.
Figure 5C:
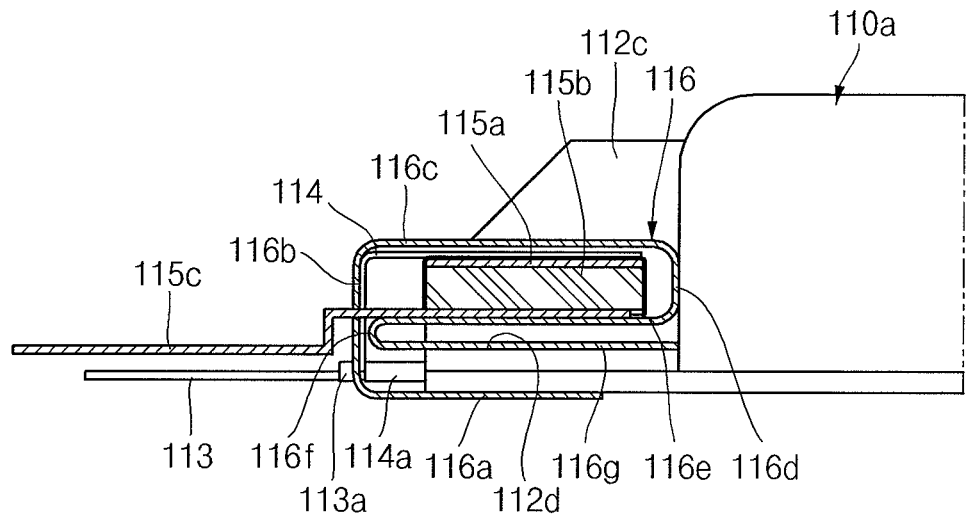
FIG. 5c is a cross sectional view taken along line 5c-5c of FIG. 5b.

FIG. 5a is a perspective view illustrating a PTC assembly of the battery pack and a surrounding structure of the PTC assembly in a state when a protection tape is not applied, FIG. 5b is a perspective view illustrating the PTC assembly and the surrounding structure in a state when protection tape is applied, and FIG. 5c is a cross sectional view taken along line 5c-5c of FIG. 5b.

Referring to FIG. 5a, the first and second cell tabs 113 and 114 may extend and protrude to an outer side through the flat portion 112d disposed at the pouch 112 constituting the first battery cell 110a. Here, a first insulating tape 113a may be disposed between the first cell tab 113 and the flat portion 112d, and a second insulating tape 114a may be disposed between the second cell tab 114 and the flat portion 112d. The first insulating tape 113a and the second insulating tape 114a can prevent a short circuit between the both first and second cell tabs 113 and 114 and a metal layer (not illustrated) constituting the pouch 112.

In this embodiment, although the first cell tab 113 extends in a flat panel shape, the second cell tab 114 is bent upward a plurality of times while having a flat panel shape, and an end portion of the second cell tab 114 is disposed roughly in parallel with an upper portion of the flat portion 112d.

Also, the PTC assembly 115 may be electrically connected to the second cell tab 114. In other words, one end of the first lead plate 115 may be connected to the second cell tab 114. In addition, an upper surface of the PTC device 115b may be electrically connected to the other end of the first lead plate 115a. Further, the second lead plate 115c may be connected to a lower surface of the PTC device 115b. The second lead plate 115c may be disposed roughly in parallel with the first cell tab 113 by extending to an outer side from the flat portion 112d. In this embodiment, the first cell tab 113 and the second lead plate 115c have almost the same width, so that connection to the PCM can be easy.

Here, the first lead plate 115a, the PTC device 115b, and the second lead plate 115c may be covered by a protection film 115d so that the first lead plate 115a, the PTC device 115b, and the second lead plate 115c can be fixed well mutually.

Referring to FIG. 5b, the second cell tab 114 and the PTC assembly 115 may be covered by the protection tape 116 for protection from external environments. The second lead plate 115c may have a shape extending and protruding to an outer side through an incised portion 116h disposed at the protection tape 116 since the second lead plate 115c needs to be electrically connected to the PCM.

Referring to FIG. 5c, the protection tape 116 may include a first area 116a, a second area 116b, a third area 116c, a fourth area 116d, a fifth area 116e, a sixth area 116f, and a seventh area 116g. The first area 116a may be glued to a lower surface of the flat portion 112d. The second area 116b may be bent upward from the first area 116a, and disposed at a front portion of the flat portion 112d. The third area 116c may be bent from the second area 116b, and cover upper portions of the second cell tab 114, the first lead plate 115a, the PTC device 115b, and the second lead plate 115c. The fourth area 116d may be bent from the third area 116c, and disposed oppositely to the second area 116b. The fifth area 116e can cover a bottom surface of the second lead plate 115c. The sixth area 116f may be bent from the fifth area 116e, and disposed close to the second area 116b. The seventh area 116g may be bent from the sixth 116f, and glued to an upper surface of the flat portion 112d.

In the abovementioned manner, the PTC assembly 115 is disposed at the upper portion of the flat portion 112d. Therefore, a space for disposing the PTC assembly 115 between the first battery cell 110a and the PCM 120 is unnecessary. As such, a distance between the first battery cell 110a and the PCM 120 can be minimized, and the battery pack 100 can be compact.

Here, the protection tape 116 may be an insulating material electrically, and a conductive material thermally. For example, the protection tape 116 may be thermally conductive acrylic foam tape formed of a ceramic particle, a decompressive acrylic agent, and a flame retardant. However, embodiments of the present invention are not limited thereto.

When the protection tape 116 is thermally conductive, the PTC assembly 115 is more sensitive to a temperature change of the battery cell, and reliability of the battery pack increases.

Figure 6:
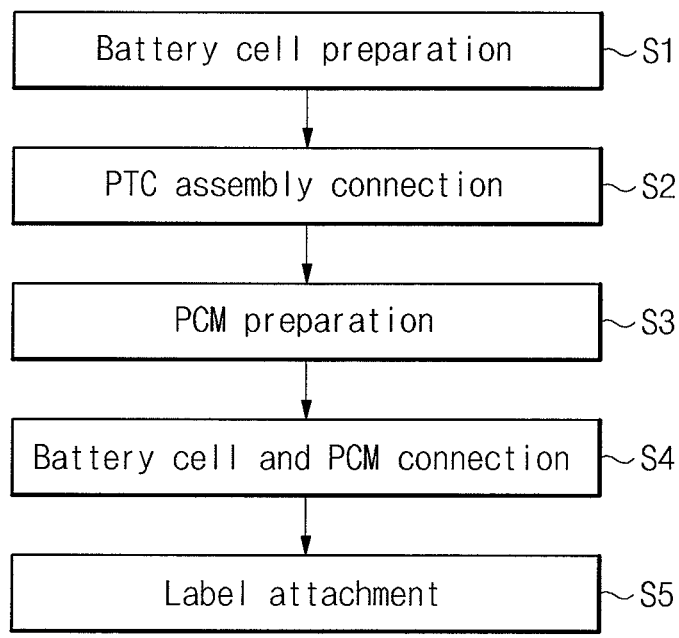
FIG. 6 is a flowchart illustrating a method of manufacturing a battery pack according to another embodiment of the present invention.

FIG. 6 is a flowchart illustrating a method of manufacturing a battery pack according to another embodiment of the present invention.

Referring to FIG. 6, the battery pack manufacturing method according to embodiments of the present invention includes battery cell preparation step S1, PTC assembly connection step S2, PCM preparation step S3, battery cell and PCM connection step S4, and label attachment step S5.

Figure 7:
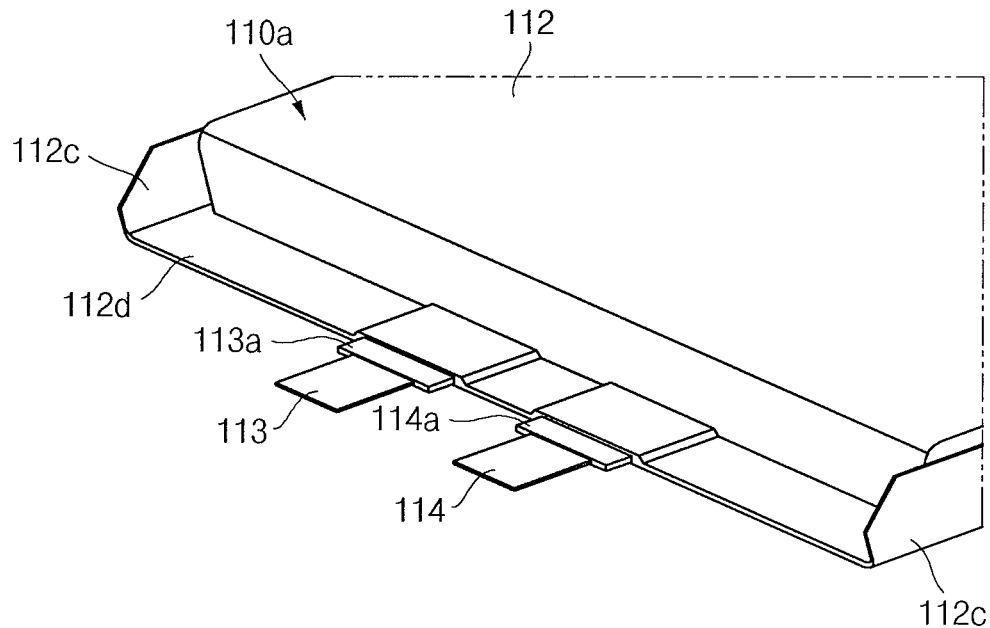
FIG. 7 is a partial perspective view illustrating a step when a battery cell of the battery pack of FIG. 6 is prepared.

FIG. 7 is a partial perspective view illustrating a step when a battery cell of the battery pack of FIG. 6 is prepared.

Referring to FIG. 7, the first and second battery cells are prepared during the battery cell preparation step S1. Here, description of the battery cell preparation step is centered on the first battery cell since the first and second battery cells have the same form and shape.

The first battery cell 110a may, for example, have the first and second cell tabs 113 and 114 extending and protruding through the flat portion 112d disposed at a front portion of the pouch 112. In addition, the first cell tab 113 and the second cell tab 114 may be in parallel with each other. Letters 112c illustrated in FIG. 7 and not described are folded portions disposed at both opposite sides of the pouch 112, and bent upward. A letter 113a is a first insulating tape configured to cover the first cell tab 113, and a letter 114a is a second insulating tape configured to cover the second cell tab 114.

Figure 8A:
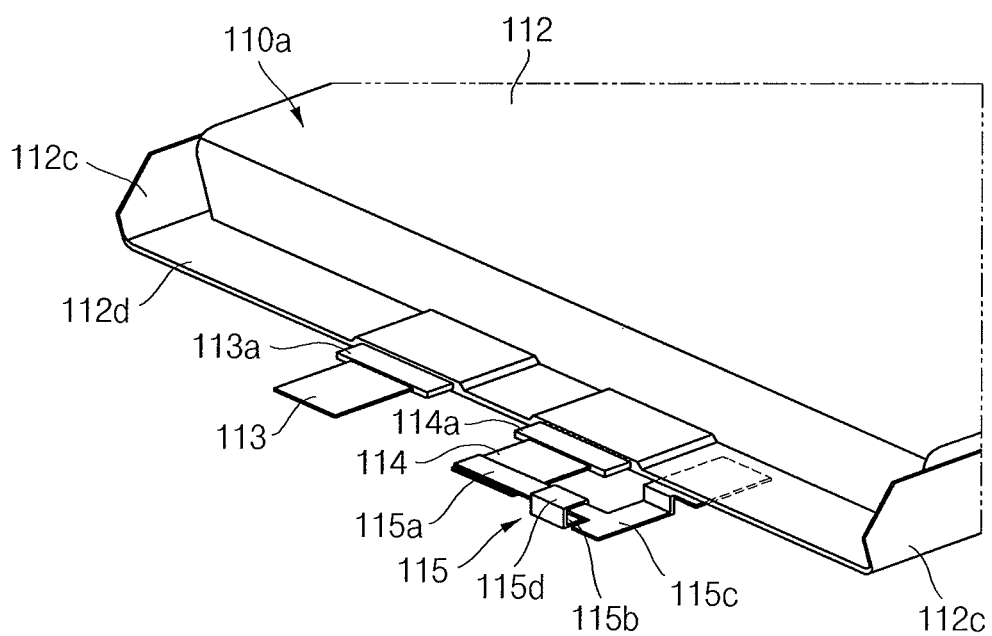
FIGS. 8a to 8c are perspective views illustrating a step when a PTC assembly of the battery pack of FIG. 6 is connected.
Figure 8B:
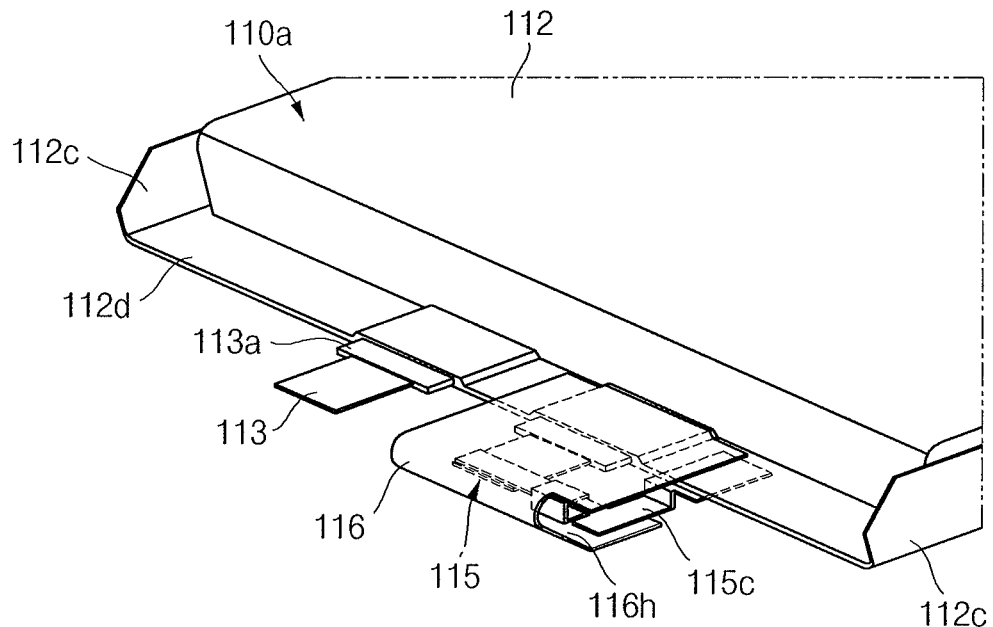
Figure 8C:
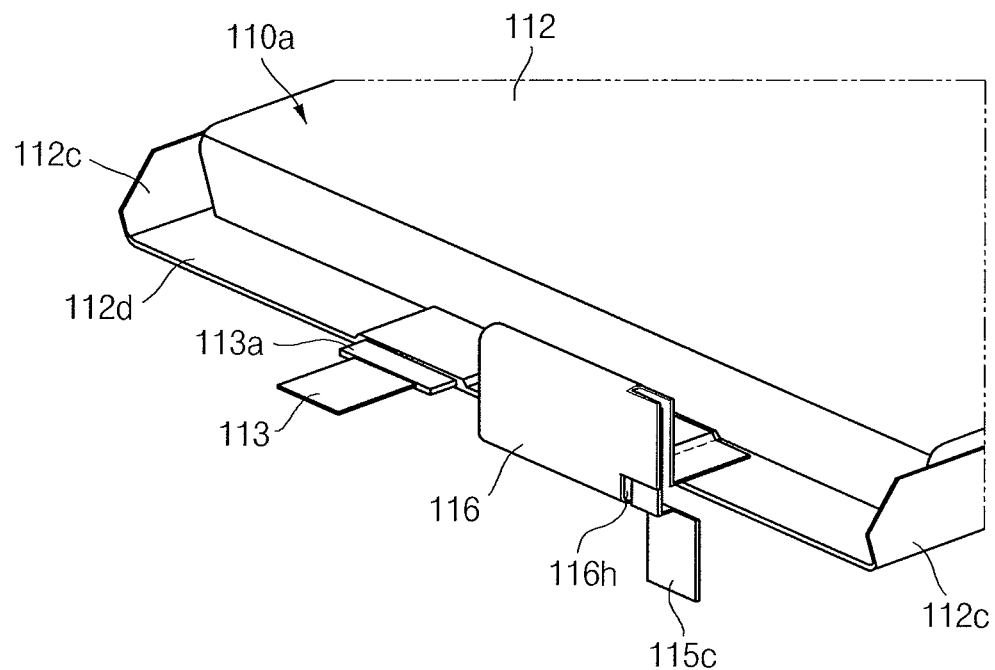

FIGS. 8a to 8c are perspective views illustrating a step when a PTC assembly of the battery pack of FIG. 6 is connected.

Referring to FIGS. 8a to 8c, the PTC assembly connection step S2 consists of a PTC assembly welding step, a protection tape attachment step, and a cell tab bending step.

Referring to FIG. 8a, the PTC assembly is welded to each of the first and second battery cells during the PTC assembly welding step. Here, the description of the PTC assembly welding step is centered on the first battery cell since the first and second battery cells have the same form and shape.

For example, the PTC assembly 115 may be welded to the second cell tab 114 of the first battery cell 110a, and the PTC assembly 115 may be electrically connected to the first battery cell 110. The PTC assembly 115 may include the first lead plate 115a, the PTC device 115b, and the second lead plate 115c, and the second plate 115c may be disposed roughly toward the flat portion 112d of the first battery cell 110a.

Referring to FIG. 8b, the PTC assembly 115 is covered by the protection tape 116 during the protection tape attachment step. Here, the second lead plate 115c of the PTC assembly 115 extends and protrudes to an outer side through the incised portion 116h of the protection tape 116. Also, an end portion of the protection tape 116 may be glued to the lower surface of the flat portion 112d of the first batter cell 110a, and the other side of the protection tape 116 may be glued to the upper surface of the flat portion 112d of the first battery cell 110a.

Referring to FIG. 8c, during the cell tab bending step, one area of the second cell tab 114 is bent upward, and the other area of the second cell tab 114 is bent roughly in parallel with the flat portion 112d so that the PTC assembly 115 is disposed on the upper surface of the flat portion 112d of the first battery cell 110a.

In the abovementioned manner, the PTC assembly 115 may be covered by the protection tape 116, and disposed on the upper surface of the flat portion 112d of the first battery cell 110a. Therefore, the PTC assembly 115 can occupy a minimum space, and react swiftly to heat generated by the first battery cell 110a.

Figure 9:
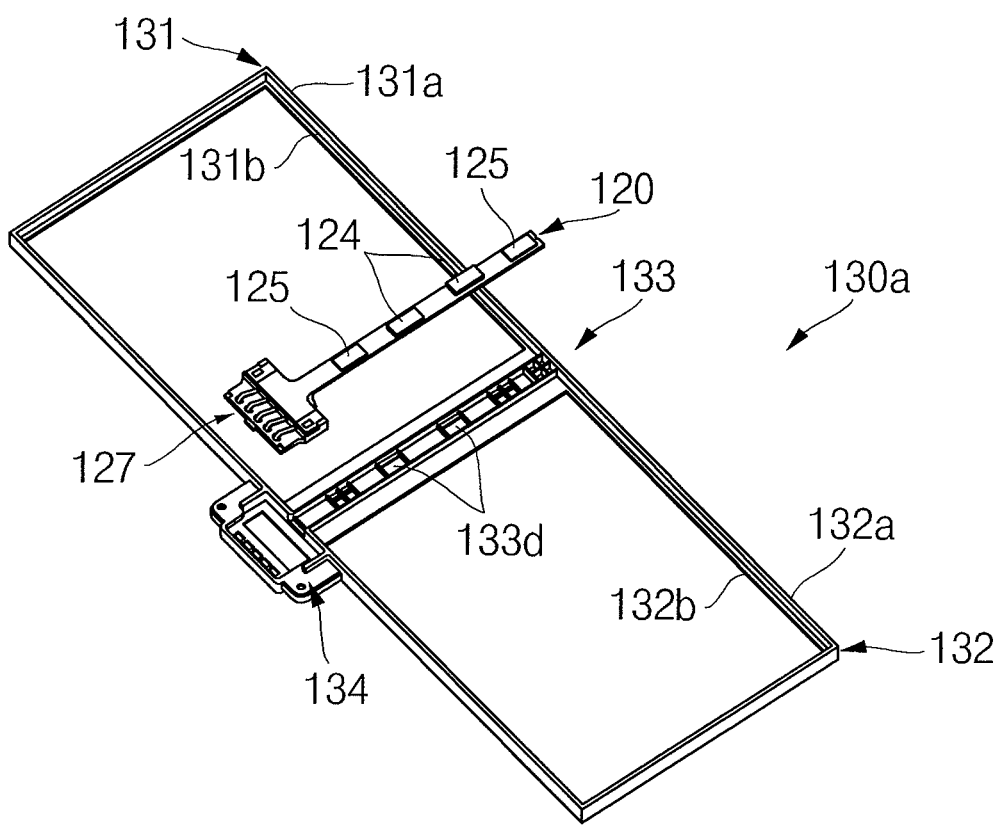
FIG. 9 is a perspective view illustrating a step when a PCM of the battery pack of FIG. 6 is prepared.

FIG. 9 is a perspective view illustrating a step when a PCM of the battery pack of FIG. 6 is prepared.

Referring to FIG. 9, the PCM 120 including the circuit board 121 which includes a through hole (not illustrated), the first conductive pad 124, the second conductive pad 125, a protection device (not illustrated), and the terminal assembly 127 are prepared during the PCM preparation step S3. In addition, the PCM 120 may be received by the third frame 133 of the resin frame 130a. Here, the through hole (not illustrated) of the circuit board 121 can correspond to the through hole 133d formed at the third frame 133.

Figure 10A:
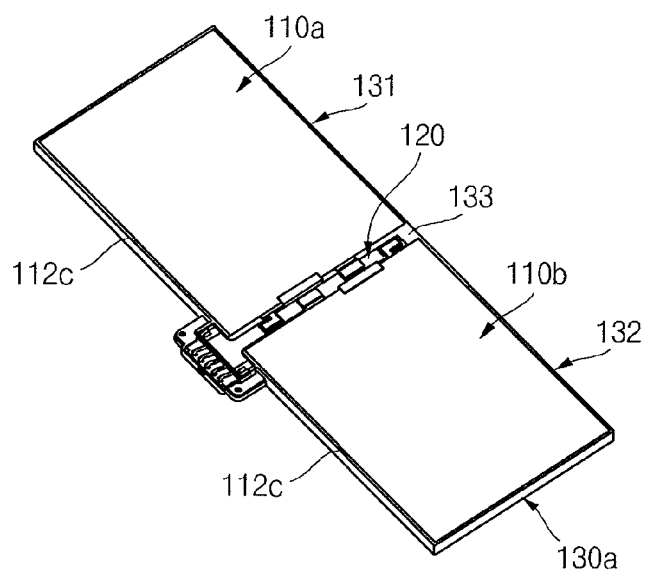
FIGS. 10a and 10b are cross sectional views illustrating a step when the battery cell and the PCM of the battery pack of FIG. 6 are electrically connected.
Figure 10B:
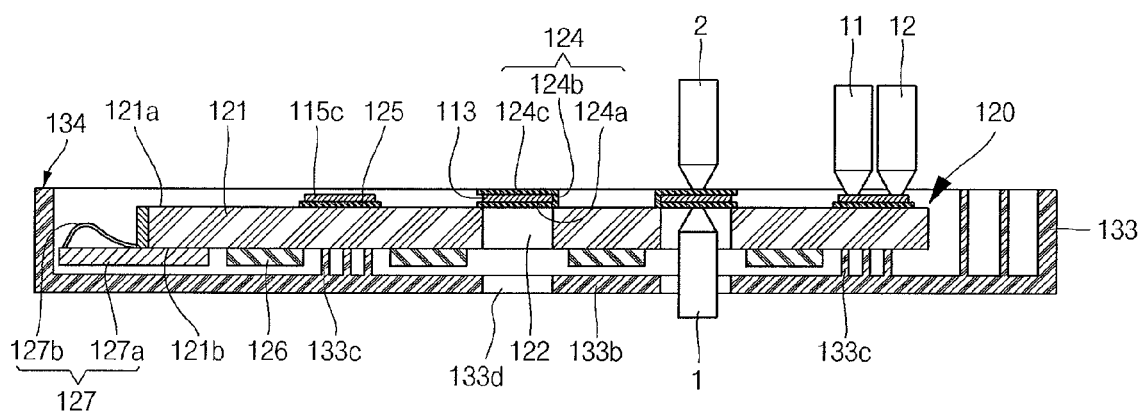

FIGS. 10a and 10b are cross sectional views illustrating a step when the battery cell and the PCM of the battery pack of FIG. 6 are electrically connected.

Referring to FIGS. 10a and 10b, the battery cell and PCM connection step may include a step in which the first battery cell is connected to the first frame of the resin frame and the second battery cell is connected to the second frame of the resin frame, a step in which the first cell tabs of the first and second battery cells are electrically connected to the first conductive pad of the PCM, and a step in which the second lead plates of the first and the second battery cells are electrically connected to the second conductive pad of the PCM.

Referring to FIG. 10a, the first battery cell 110a may be connected to the first frame 131 of the resin frame 130a in a reversed manner, and the second battery cell 110b may be connected to the second frame 132 of the resin frame 130a in a reversed manner.

In the abovementioned manner, the folded portions 112c disposed at both opposite sides of the first battery cell 110a can face downward, and the end portion of the folded portion 112c may be disposed toward a bottom portion of the first frame 131. Also, the folded portions 112c disposed at both opposite sides of the second battery cell 110b can face downward, and the end portion of the folded portion 112c may be disposed toward a bottom portion of the second frame 132.

In the abovementioned manner, the metal layer exposed through the end portion 112c may not be exposed to an outer side both during and after the process of assembling the battery pack 100.

Referring to FIG. 10b, each of the first cell tabs 113 of the first and second battery cells is connected to the first conductive pad 124 consisting of the first, second, and third areas 124a, 124b, and 124c. Then, a first welding rod 1 applies pressure to the first area 124a of the first conductive pad 124 through the through hole 113d formed at the third frame 133 of the resin frame 130a and the through hole 122 formed at the circuit board 121 of the PCM 120. In addition, a second welding rod 2 applies pressure to the third area 124c of the first conductive pad 124. Here, when voltage of opposite polarity is applied to the first and second welding rods 1 and 2, each of the first cell tabs 113 of the first and second battery cells can be welded to each of the first conductive pads 124. This welding method is especially advantageous when the first cell tab 113 is formed of aluminum or aluminum alloy, and the first conductive pad 124 is formed of nickel, nickel alloy, copper, or copper alloy. Since the melting point of aluminum metal at 660° C. is lower than the melting point of nickel metal at 1,453° C. or the melting point of copper metal at 1,083° C., welding between aluminum metal and nickel metal or between aluminum metal and copper metal is difficult. However, welding becomes possible when the aluminum metal is covered by the nickel metal or the copper metal, as described above.

Meanwhile, the second lead plate 115c disposed at the first and second battery cells may be received by each of the second conductive pads 125 having a flat panel shape. Then, first and second welding rods 11 and 12 apply pressure to the second lead plate 115c. Here, when voltage of opposite polarity is applied to the first and second welding rods 11 and 12, each of the second lead plates 115c disposed at the first and second battery cells is welded to the second conductive pad 125. This welding method is especially advantageous when the second lead plate 115c and the second conductive pad 125 are formed of nickel, nickel alloy, copper, or copper alloy.

In other words, since the second lead plate 115c and the second conductive pad 125 have the same melting point when having the same material, the second lead plate 115c and the second conductive pad 125 can be easily welded to each other even in a state in which the second lead plate 115c and the second conductive pad 125 come into contact with each other in a flat panel shape.

Figure 11:
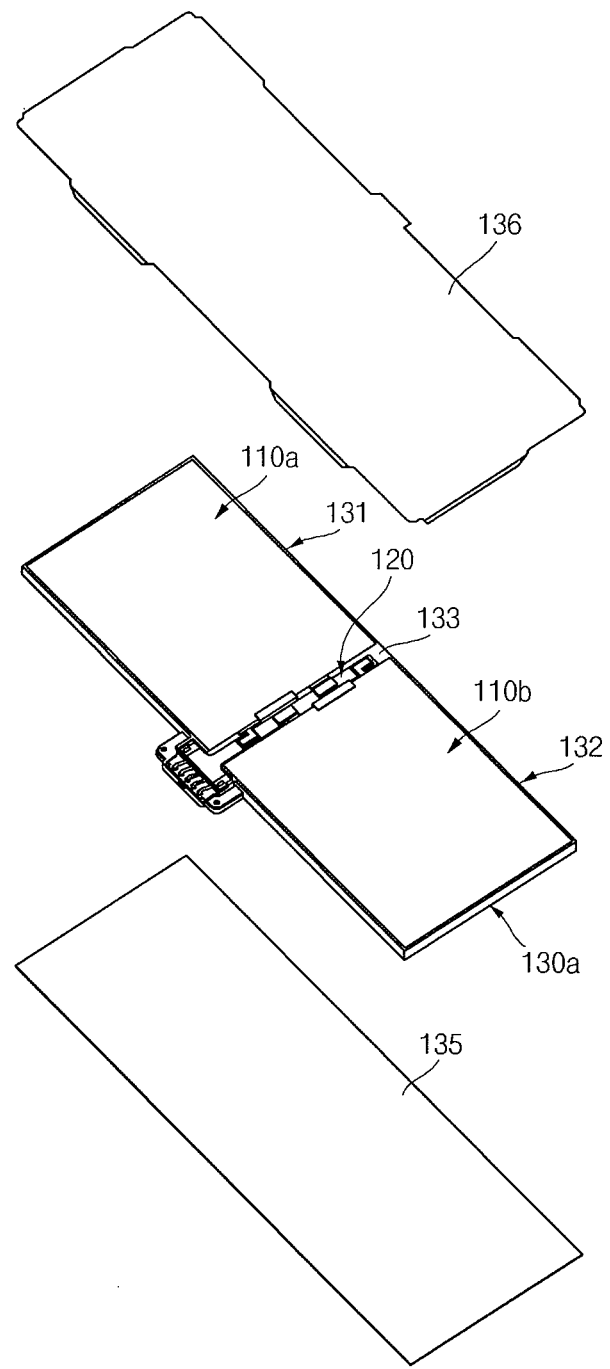
FIG. 11 is a perspective view illustrating a step when a label is attached to the battery pack of FIG. 6.

FIG. 11 is a perspective view illustrating a step when a label is attached to the battery pack of FIG. 6.

Referring to FIG. 11, the first label 135 is attached to a lower surface of the resin frame 130a receiving the first battery cell 110a, the second battery cell 110b, and the PCM 120, and the second label 136 is attached to an upper surface of the resin frame 130a during the label attachment step S5.

Of course, an additional reinforcing member may couple the first label 135 with the first battery cell 110a, the second battery cell 110b, and the PCM 120 for strength enhancement. Also, an additional reinforcing member may couple the second label 136 with the first battery cell 110a, the second battery cell 110b, and the PCM 120.

In the abovementioned manner, the lower surfaces of the first and second battery cells 110a and 110b exposed through the lower surface of the resin frame 130a can be protected from external environments. Also, the upper surfaces of the first and second battery cells 110a and 110b exposed through the upper surface of the resin frame 130a can be protected from external environments.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
   a plurality of battery cells each having at least one electrode connected to a cell tab wherein the battery cells have a width and the cell tab extends outward from the width edge of the battery cells;
   a pouch accommodating the battery cell, wherein the pouch comprises a metal layer, a first insulating layer disposed at one side of the metal layer, and a second insulating layer disposed at another side of the metal layer;
   a protective circuit module coupled to at least two battery cells wherein the protective circuit module comprises a circuit board that has a width and a length; and
   an accommodating element configured to accommodate the protective circuit module and to allow the protective circuit module to be positioned between the at least two battery cells among the plurality of battery cells,
   wherein the plurality of battery cells being arranged into at least one pair so that the cell tabs of each of the paired battery cells extend in the opposite direction of the cell tab of the opposed battery cell of the at least one pair of battery cells with the protective circuit module interposed between the at least one pair of battery cells so as to receive at least cell tab from opposed directions along each of the lengths of the circuit board, and
   the length of the circuit board extends parallel to the width of the battery cells and the width of the circuit board is interposed between the two battery cells.

2. The battery pack of claim 1, wherein the accommodating element comprises a sidewall for accommodating the protective circuit module.

3. The battery pack of claim 2, wherein the side wall comprises a through hole so as to electrically connect the plurality of battery cells to the protective circuit module.

4. The battery pack of claim 1, wherein the accommodating element further comprises a case for accommodating the plurality of battery cells.

5. The battery pack of claim 1, wherein the accommodating element further comprises a terminal receiving portion extending from the accommodating element for accommodating a terminal extending from the circuit board.

6. The battery pack of claim 1, wherein at least one battery cell comprises a first electrode plate having a first polarity and a second electrode plate having a second polarity opposite the first polarity, wherein the first electrode plate is connected to a first cell tab and the second electrode plate is connected to a second cell tab, wherein the circuit board comprises a first conductive pad, a second conductive pad separated from the first conductive pad, and a through hole under the first conductive pad.

7. The battery pack of claim 6, wherein the first cell tab of the battery cell extends from the battery cell to couple to the first conductive pad.

8. The battery pack of claim 7, wherein the first conductive pad comprises a first portion disposed over the through hole in the circuit board, a second portion bent upward from the first portion, and a third portion bent from the second portion such that the third portion is substantially parallel to the first portion, and wherein the first cell tab is positioned between the first and third portions and adhered to the first and third portions.

9. The battery pack of claim 8, wherein the first conductive pad and the first cell tab comprise different materials.

10. The battery pack of claim 9, wherein the first conductive pad comprises nickel, a nickel alloy, copper or a copper alloy, and wherein the first cell tab comprises aluminum or an aluminum alloy.

11. The battery pack of claim 7, wherein the second cell tab of the battery cell extends from the battery cell and is bent a plurality of times, and wherein the second cell tab is coupled to a positive temperature coefficient assembly.

12. The battery pack of claim 11, wherein the positive temperature coefficient assembly comprises a lead plate coupled to the second conductive pad, and wherein the lead plate extends in a direction parallel to the first cell tab.

13. The battery pack of claim 12, wherein the second conductive pad and the lead plate comprise the same materials.

14. The battery pack of claim 13, wherein the second conductive pad and the lead plate comprise nickel, nickel alloy, copper, or copper alloy.

15. The battery pack of claim 7, wherein labels cover upper and lower surfaces of the battery cells and of the protective circuit module.

16. The battery pack of claim 4, wherein the case comprises a height and the accommodating element comprises a height that is less than the height of the case.

17. The battery pack of claim 8, wherein the accommodating element comprises a through hole under the first conductive pad and under the through hole in the circuit board.

* * * * *